March 3, 1964  J. V. GRIM ETAL  3,123,380
VEHICLE MEANS FOR ELONGATED AND/OR HEAVY OBJECTS
Filed Jan. 23, 1961  5 Sheets-Sheet 1
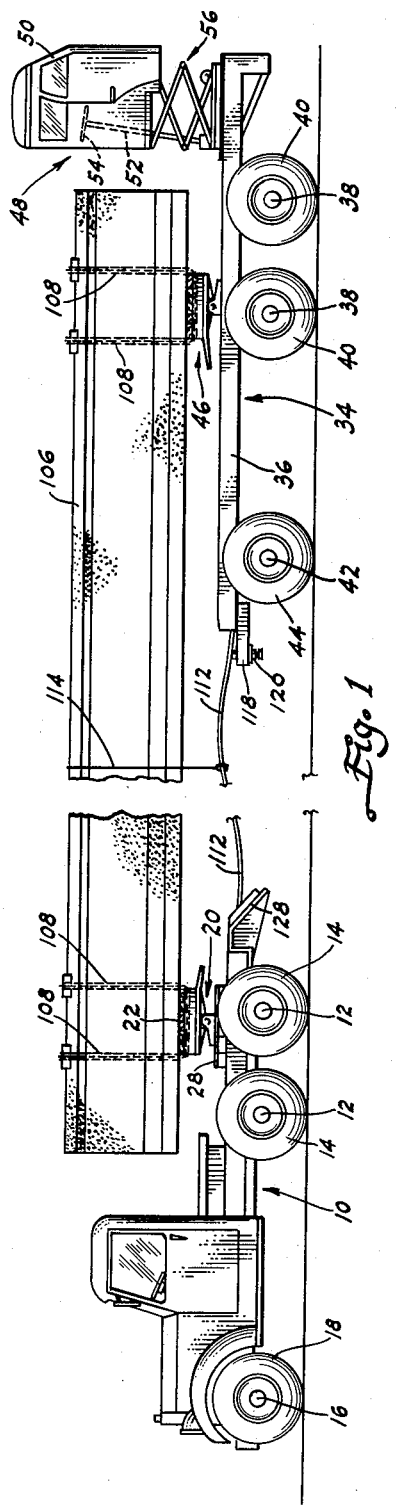
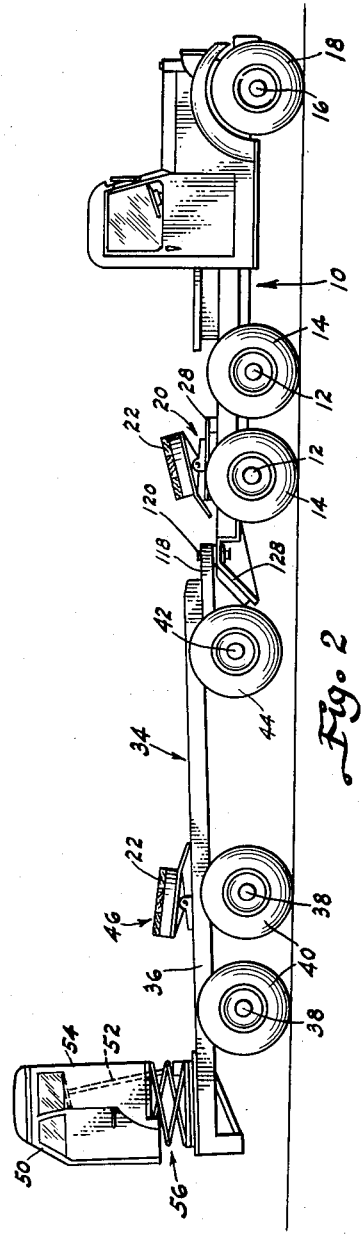
INVENTORS
JOHN V. GRIM
RICHARD R. GRIM
BY
ATTORNEY March 3, 1964  J. V. GRIM ETAL  3,123,380
VEHICLE MEANS FOR ELONGATED AND/OR HEAVY OBJECTS
Filed Jan. 23, 1961  5 Sheets-Sheet 2

INVENTORS
JOHN V. GRIM
RICHARD R. GRIM
BY
ATTORNEY

March 3, 1964 J. V. GRIM ETAL 3,123,380
VEHICLE MEANS FOR ELONGATED AND/OR HEAVY OBJECTS
Filed Jan. 23, 1961 5 Sheets-Sheet 3

INVENTORS
JOHN V. GRIM
RICHARD R. GRIM
BY
ATTORNEY

March 3, 1964   J. V. GRIM ETAL   3,123,380
VEHICLE MEANS FOR ELONGATED AND/OR HEAVY OBJECTS
Filed Jan. 23, 1961   5 Sheets-Sheet 4

INVENTORS
JOHN V. GRIM
RICHARD R. GRIM
BY
ATTORNEY

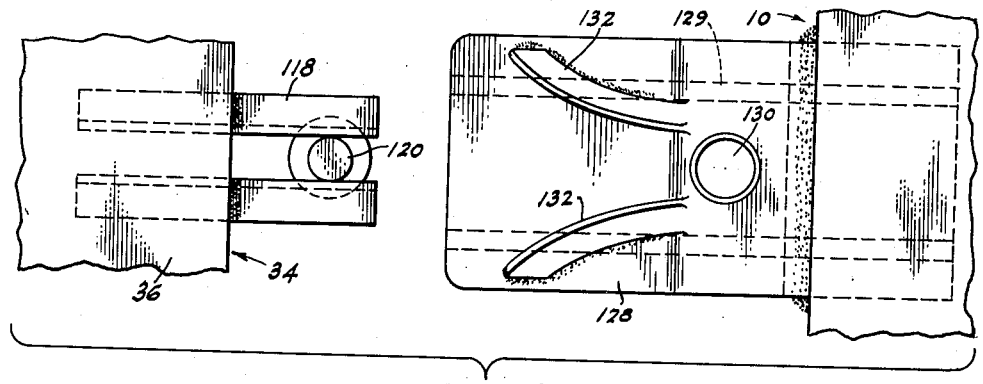
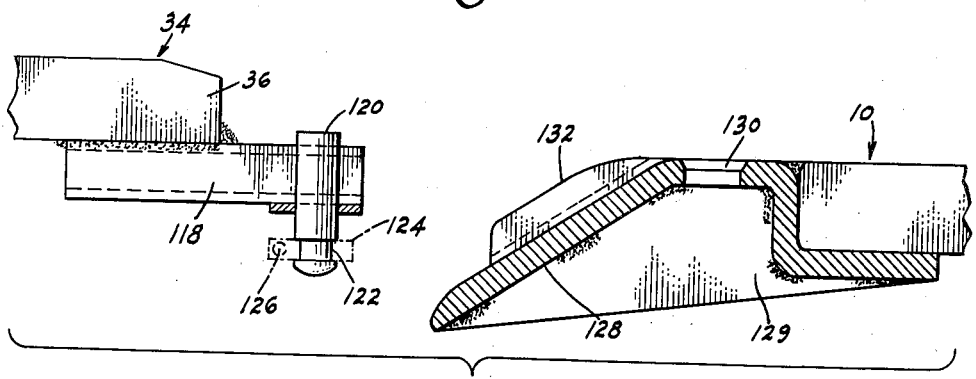
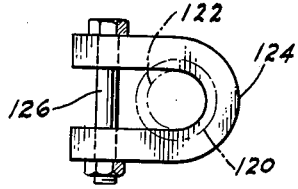
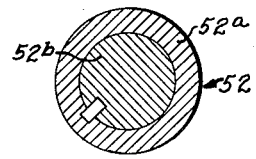
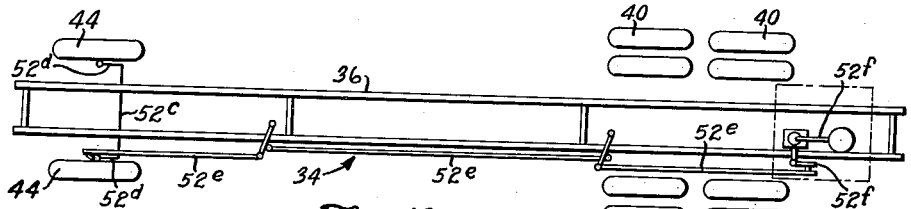

United States Patent Office 3,123,380
Patented Mar. 3, 1964

3,123,380
VEHICLE MEANS FOR ELONGATED AND/OR HEAVY OBJECTS
John V. Grim, York, and Richard R. Grim, Windsor, Pa., assignors to Grim Mfg., Inc., York, Pa., a corporation of Pennsylvania
Filed Jan. 23, 1961, Ser. No. 84,122
9 Claims. (Cl. 280—404)

The present invention pertains to vehicle means for transporting on highways and work sites elongated and/or heavy objects and, more particularly, this invention pertains to cooperable tractor and trailer units which are connected to each other, for draft purposes, solely through the elongated objects supported adjacent the opposite ends thereof respectively by said tractor and trailer units, whereby the tractor unit pulls the trailer unit through the means of the object or objects being hauled thereby.

Although certain types of trailer units have been used heretofore, particularly in the public utility and pipe line industries for hauling long lengths of pipe or poles, in regard to which a relatively simple type of single axle trailer is lashed to the rearward portions of the elongated objects being hauled by the tractor and simple trailer referred to, a number of handicaps have been present in such arrangements. One of the principal handicaps comprises the inability to properly steer the loaded tractor-trailer units when hauling objects of substantial length of the order of 50 feet or more, particularly in regard to negotiating certain corners and turns, whether the units are moving forwardly or rearwardly.

Another difficulty frequently experienced is the flexure to which the elongated articles are subjected while being hauled by such tractor-trailer unit arrangement and particularly under circumstances where the frame of the single axle trailer unit, for example, is lashed fore and aft rigidly to the elongated objects being hauled thereby, particularly under circumstances where the trailer unit has brakes which can be applied by the operator of the tractor unit.

Under conditions where the brakes possibly may be applied too strongly at first, there is a tendency for the braking action of the trailer wheels to tend to rotate the trailer unit in a forwardly and downwardly direction, thereby placing very substantial flexing forces upon the elongated articles being hauled by the tractor-trailer units. Such stresses, particularly where bendable material is being hauled, can and does frequently place permanent bends or other irregularities in the material.

One industry which has been somewhat directly responsible for the development of the instant invention comprises the prestressed concrete beam industry which has made great advances in recent years, not only as to the volume of annual production of such pre-stressed reinforced concrete beams, but also in the sizes and weights of beams which now are available. For example, it is not uncommon at present to manufacture such pre-stressed concrete beams in lengths of 100 feet, or greater, having weights of the order of 100 tons or more. Such weights and sizes can be hauled and otherwise handled by railway rolling stock without serious difficulty. However, it is necessary to transport said reinforced concrete beams from the point of manufacture thereof to the job site and such job sites usually occur in areas where completed and/or smooth roads are not present, at least directly up to the site where the beams are to be used, whereby very substantial problems have been presented in connection with the final hauling of these beams to, and installing the same upon, the piers or other types of seats or abutments which are to receive the beams at the job site.

Another problem presented by the hauling of pre-stressed concrete beams is the fact that they must be supported, while being hauled, in the vertical position within which they ultimately are to be placed. Should these beams be supported adjacent opposite ends and placed upon their sides or positioned so that the normally top edge is lowermost, serious cracking of the beam and even permanent injury thereto can take place while said beam is so supported, particularly if it is moving over a highway or otherwise and is subjected to even limited jostling incident to such hauling operations.

In addition to the possibility of subjecting the elongated items being hauled to undue or severe flexure while using particularly a single axle trailer unit, for example, and the inability to have the trailer track behind the tractor unit as desired, especially when elongated members of very substantial length are being hauled, unsafe conditions also exist due to the possibility of the lashings and moorings connecting the trailer unit to the load members either loosening or becoming broken, especially without the driver in the tractor being aware thereof.

Rather than use trailer units which are connected to the tractor units solely by the elongated load members being hauled thereby, it also is old to connect the trailer unit to the tractor unit by some sort of elongated means such as a tongue-like member and, under some circumstances, it is not unknown to employ a second operator, who might be called a steersman, who is positioned upon the trailer member for purposes of steering the rear wheels of the trailer member for example. An arrangement of this type is employed in hook and ladder units of fire fighting equipment. In such equipment, the rear pair of wheels usually are carried by a single axle, which is the only axle upon the trailer unit of the hook and ladder unit, and said wheels are capable of being steered independently of the wheels on the tractor unit, whereby a relatively long unit of such type can negotiate corners more sharp than those which can be negotiated when no steering effect is provided relative to the wheels of the trailer unit. However, considerable expense is required to provide the connecting frame or extensive tongue means which must be rigidly braced against appreciable flexure and by which means the rear axle or trailer unit is connected to the tractor unit.

It is the principal object of the present invention to provide a combination of a tractor unit and a trailer unit which are adapted to be connected only through the elongated load member or members to be hauled thereby, said units both including load supporting means which are swivelly connected to the units for movement about vertical and also transversely horizontal axes and each of said units have at least two axles which are spaced longitudinally of the units from each other and have supporting wheels thereon, the tractor unit having its conventional steering arrangement and the trailer unit having its steering means which are operable independently of the tractor unit by a second operator who is seated in adjustable means preferably near the rear end of the trailer unit and at an elevation sufficiently high that he can see from above the load carried by the tractor and trailer units. In the preferred embodiment of the invention, the positioning means for the operator, which may be a seat, for example, and the steering mechanism are adjustably positionable at various vertical positions within a substantial range, whereby the tractor and trailer units may be adapted to hauling loads of various heights, and still permit ready steering of the trailer unit.

Another object of the invention is to provide preferred positions on the tractor and trailer units for mounting the swivelly connected load supporting means, whereby the load is distributed with maximum efficiency relative to both the tractor and trailer units.

A further object of the invention is to provide, in a preferred embodiment of the invention, interengageable coupling means comprising connecting members for hitching the forward end of the trailer unit and the rearward end of the tractor unit together, said connecting members, when operatively engaging each other, being so arranged relatively in a vertical direction that the forward end and front steerable wheels of the tractor unit are elevated above the roadway surface, whereby the forward portion of the trailer unit is supported by the tractor unit for hauling of the trailer unit by the tractor unit as when the units are deadheading or otherwise are traveling without a load supported thereby. Ancillary to this object of the invention, camming means are provided by which coupling may take place automatically by relative movements in a longitudinal direction between the trailer and tractor units.

Details of the foregoing objects and of the invention, as well as other objects thereof, are set forth in the following specification and illustrated in the drawings comprising a part thereof.

In the drawings:

FIG. 1 is an exemplary side elevation showing tractor and trailer vehicle units embodying the principles of the present invention and supporting a heavy elongated load member extending therebetween, part of the load member being broken away intermediately of its ends to foreshorten the view.

FIG. 2 is a view on the same scale as FIG. 1 but showing the forward end of the trailer unit hitched to the rearward end of the tractor unit with the front wheels of the trailer unit elevated above the roadway, as when the units are deadheading.

FIG. 16 is a fragmentary, exploded plan view showing coupling means of an exemplary type for hitching the front end of a trailer unit to the rear end of the tractor unit.

FIG. 17 is a fragmentary exploded side elevation of the coupling means shown in FIG. 16.

FIG. 18 is a plan view of locking means for the coupling means.

FIG. 19 is a plan view somewhat schematically illustrating exemplary steering mechanism for the front wheels of the trailer vehicle.

FIG. 20 is a transverse sectional view of the steering column of the trailer vehicle and showing exemplary keying means employed therein.

Figure 3:
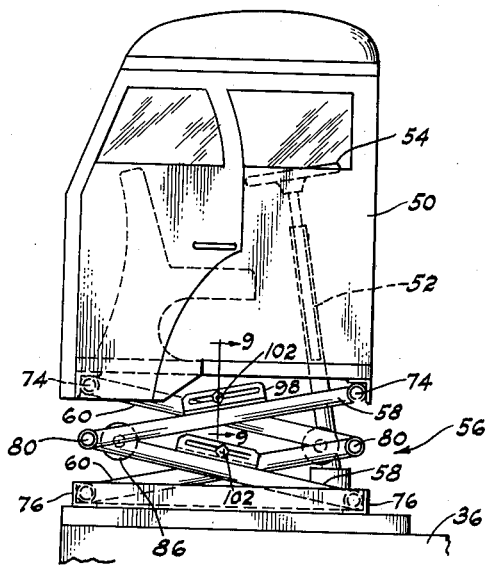
FIG. 3 is a fragmentary side elevation on a larger scale than used in FIGS. 1 and 2 and illustrating the operator positioning and steering means which is carried by the trailer unit, said means being shown in one of its lowered positions in which the same is capable of being adjustably secured.

Referring to the drawings and particularly FIGS. 1 and 2, it will be seen that the tractor unit 10, in its preferred embodiment, has a pair of rear axles 12 thereon, the same being spaced longitudinally diagrammatically illustrated, the same being spaced longitudinally of the tractor unit and supporting conventional wheels 14 thereon. The front axle 16 has conventional front wheels 18 thereon which are mounted for steering by conventional means.

Figure 11:
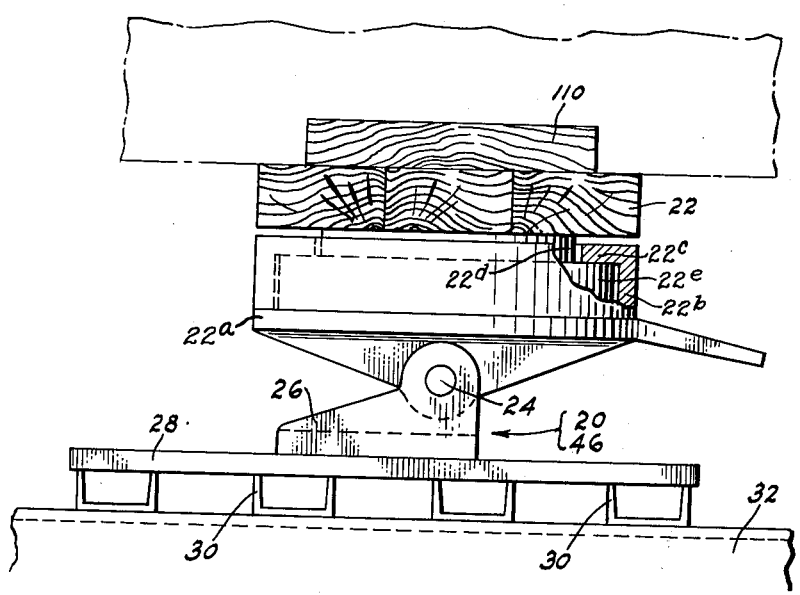
FIG. 11 is a fragmentary vertical side view of one of the load supporting means used respectively on the tractor and trailer units.
Figure 12:
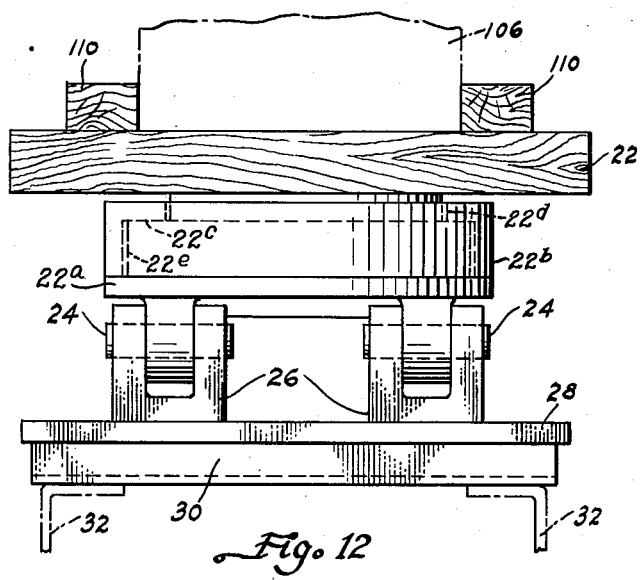
FIG. 12 is an end view of the load supporting means shown in FIG. 11.

Also mounted upon the tractor unit 10 is load supporting means 20 comprising a transverse pillow member or rest 22 which, by referring to FIGS. 11 and 12 particularly, will be seen to be pivotally connected about a transverse horizontal axis 24 carried by the upper end of a vertical member 26 which is fixed relative to the stationary heavy steel plate 28 which is rendered rigid in any suitable manner such as by a plurality of transverse steel channel members 30 which extend between and are connected to the spaced chassis channels 32. Rest 22 also is supported for movement about a vertical axis midway of the length of axes 24 by swivel mechanism comprising a casting 22$^a$ having a flat top surrounded by a cylindrical member 22$^b$ which is fixed to casting 22$^a$ and has a radial upper flange 22$^c$. Fixed to the lower surface of rest 22 is a heavy short circular pivot member 22$^d$ extending through the opening defined by the perimeter of flange 22$^c$ and terminating in an enlarged pivot head 22$^e$ that rotatably engages the flat upper surface of casting 22$^a$. Accordingly, the transverse pillow or rest 22, which directly receives the forward end of the elongated load member or members, is swivelly connected to the tractor member 10 for movements about a vertical axis as well as a horizontal transverse axis, somewhat universal movement thereby being assured except that the opposite ends of the transverse rest 22 are incapable of any appreciable vertical movement relative to the chassis of the tractor unit 10.

The vehicle means of the present invention also includes a trailer unit 34 for use in combination with the tractor unit 10. Essentially, said unit comprises an elongated frame 36 to which preferably a plurality of transverse rear axles 38 are connected in longitudinally spaced relationship to each other for the support of rear wheels 40. The front axle 42 also is shown in similar diagrammatic fashion to the rear axles 38 and it will be seen that the front axle 42 is spaced a substantially greater distance from the rear axles 38 than said rear axles are from each other for purposes to be described. The front axle 42 supports a pair of front wheels 44 which are supported by the axle for conventional steering purposes. Load supporting means 46, the details of which are similar to the load supporting means 20 of the tractor, are supported by the trailer unit 34 adjacent the rear wheels.

The specific location and connection of the load supporting means 46 to the frame 36 of the trailer is between the rear axles 38, considered in a longitudinal direction. As with the load supporting means 20 of the tractor unit 10 which is also positioned longitudinally between the rear axles 12, such position is not actually between the axles but rather, a vertical projection dropped from the load supporting means of both the tractor and trailer units would extend between the rear axles of both of said units. With regard to the trailer unit however, the load supporting means 46 preferably is placed substantially closer, in a longitudinal direction, to the forwardmost axle of the rear wheels 38 than the rearwardmost axle. Such positioning is for purposes of placing the load upon the trailer unit 34 for maximum efficiency in distribution of the weight to all wheels and axles of the trailer unit.

Steering and operator positioning means 48, which essentially comprises a cab 50, having a steering column 52 of a longitudinally extensible type, and a steering wheel 54 fixed to the upper end of the uppermost member of the extensible steering column 52, is supported by the frame 36 of the trailer unit, preferably adjacent the rear end thereof. The longitudinally extensible steering column 52 comprises any suitable mechanical details such as an exterior sleeve 52a longitudinally keyed to a steering shaft 52b as clearly shown in FIG. 20. Steering of the front wheels 44 of the trailer vehicle is accomplished by any suitable mechanism shown in FIG. 19 such as tie-bar 52c connected between the usual steering arms 52d connected to the front wheel axles of conventional pivoted type. A series of inter-connected drag links 52e are disposed between and connected at one end to the usual steering arms 52d, and at the other end is connected to the steering arm 52f which is actuated by the steering shaft 52b. One of the essential characteristics of the invention comprises the vertically adjustable supporting mechanism 56 which is fixed at its lower end to the frame 36 and at its upper end to the under portion of cab 50.

While various types of vertically adjustable supporting means for the cab 50 and steering mechanism could be employed in accordance with the spirit of the present invention, a very effective and easily operated specific type of such means is illustrated in FIGS. 3 through 9. Said means, essentially, comprises a lazy tong-like arrangement comprising a plurality of pairs of pivotally connected pairs of levers 58 and 60 adjacent one side of the frame 36 and similar pairs of pivotally connected levers 62 and 64 adjacent the opposite side of said frame 36.

Figures 6, 7:
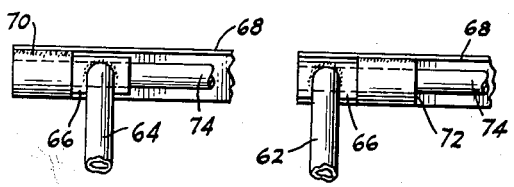
FIGS. 6, 7 and 8 are fragmentary views of various components of the cab supporting mechanism shown in FIGS. 3 through 5 for purposes of illustrating certain details thereof.

Conveniently the levers 58, 60, 62 and 64 may comprise steel pipe of suitable strength and dimensions, the opposite ends of all of which levers are welded or otherwise fixed to short pivot tubes 66, the axes of which extend transversely to the axes of the levers. Fixed to the lower portion of cab 50 are a pair of parallel brackets 68 which specifically are shown as angle irons. One of the brackets 68 carries, adjacent the opposite ends thereof, stationary pivot sleeves 70 which are welded thereto, as shown in FIG. 6, while the opposite brackets 68 carry a stationary pivot sleeve 72 which is welded thereto in spaced relationship to the outer end of the bracket 68 as clearly shown in FIG. 7.

Figure 5:
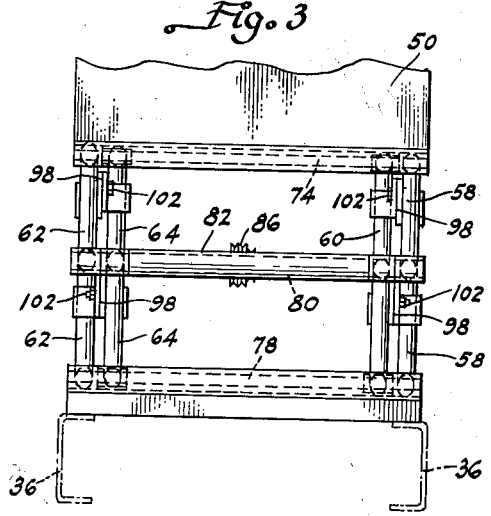
FIG. 5 is a vertical end elevation of the structure shown in FIGS. 3 and 4.

Pivot axes in the forms of pivot tubes or shafts 74 extend through the aligned pivot tubes 66 and stationary pivot sleeves 70 and 72 relative to the upper end of the supporting mechanism 56. The lower portion of the supporting mechanism also comprises a pair of elongated brackets 76 which are fixed to the chassis frame 36 either directly or to intermediate frame means, and said elongated brackets are illustrated herein specifically as angle irons. These lower angle irons also support stationary pivot sleeves similar to the sleeves 70 and 72 for purposes of receiving pivot tubes 78, about the axes of which the lower ends of levers 58, 60, 62 and 64 oscillate, as shown in FIG. 5.

Figure 8:
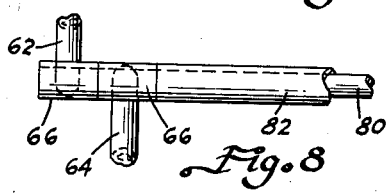

The ends of the pivotally connected levers which are intermediately between the brackets 68 and 76 in a vertical direction, likewise are provided with pivot tubes 66, as seen in FIG. 8, the axes of which tubes are transverse to the axes of the levers, and said tubes pivotally receive the opposite ends of a pivot tube or shaft 80. Also, a spacing tube 82 pivotally surrounds the pivot tube or shaft 80 and extends between the innermost ends of the pivot tubes 66.

Figure 4:
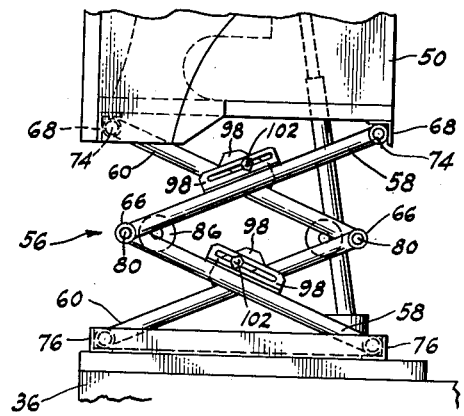
FIG. 4 is a view similar to FIG. 3 but showing the upper portion of the cab of the operator positioning means broken away and the supporting means for the cab being disposed in an extended and more elevated position than shown in FIG. 3.

As is obvious particularly from FIGS. 3 and 4, if the pivot tubes 80 are pulled toward each other, from the position shown in FIG. 3, any desired amount, a vertical elongation of the pivoted lever arrangement 56 will take place, one exemplary elevated position of which is shown in FIG. 4. Simple contractable means are employed to achieve such relative movement of the pivot tubes 80 toward and away from each other in order to dispose the cab 50, as well as the operator and the steering wheel 54 therein, at any desired vertical position, within reasonable limits, above the bed 36 of the trailer unit.

Figure 10:
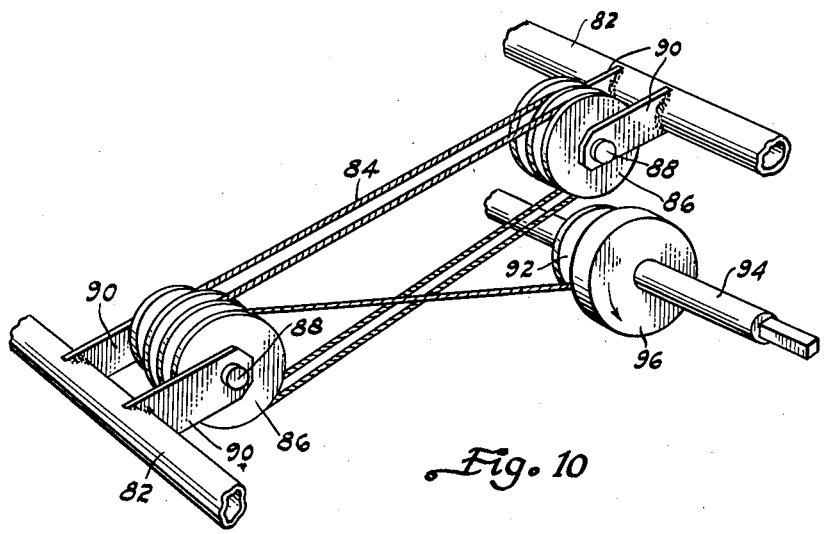
FIG. 10 is a perspective, fragmentary view showing contractable means by which the cab supporting mechanism shown in FIGS. 3 through 5 is raised and lowered.

Referring to FIG. 10, it will be seen that an exemplary contractable means comprises a flexible cable 84 which preferably is steel so as to possess maximum strength for minimum size. The cable 84 extends around a pair of multiple sheave blocks 86 which revolve around pivot pins 88 extending between the outer ends of paced ears 90 which are fixed, such as by welding, to the spacing tubes 82. A winding drum or sheave 92 is rotatable about a shaft 94 for purposes of coiling one end of the cable 84 therearound, the opposite end of the cable being fixed to one of the spacing tubes 82. The shaft 96 is rotatably supported between any opposed pair of the levers at opposite sides of the frame of the trailer and a suitable crank, not shown, is used to rotate the winding sheave 92, either in one direction to elevate the cab 50 and the mechanism carried thereby, or in the other direction to lower the cab 50 and mechanism carried thereby.

Figure 9:
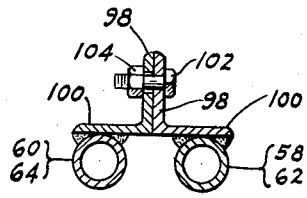
FIG. 9 is a transverse sectional view taken on the line 9—9 of FIG. 3 and employing a larger scale than used in FIG. 3.

To insure that the cab will be maintained in any desired vertically adjusted position after being elevated or lowered, as desired, it is preferred that a ratchet mechanism 96, see FIG. 10, be positioned upon the shaft 94 and engage the winding sheave 92, not only for purposes of permitting easier operation of the winding sheave, especially while an operator is standing upon the ground and shaft 94 is as high as his head or more, for example, but also to hold the wound cable at any desired position of contraction between the sheave blocks 86. However, to insure safe securing of the blocks in said position, together with the releasable locking of the cab 50 and its enclosed mechanism at any desired vertical position, by reference particularly to FIGS. 3, 4, and 9, it will be seen that, adjacent the crossings of the pairs of the levers 58, 60, 62 and 64, they are provided with suitable parallel fixed flanges 98, which may comprise one web of a suitable length of angle iron, the other web 100 of which is fixed by welding or otherwise to one of the levers and preferably flanges 98 are parallel to each other and in sliding relationship to each other as shown in FIG. 9.

One of the flanges 98 is longitudinally slotted as best shown in FIGS. 3 and 4, while the other flange has a hole therethrough through which a locking bolt 102 extends. The bolts 102 also extend through the slots of the opposite flanges 98 and are engaged by a clamping nut 104 as shown in FIG. 9. Tightening of the nuts and bolts readily can be accomplished by the same crank means used to rotate the winding shaft 94 for example, and when clamping nuts and bolts are tightened at both sides of the supporting mechanism 56, the cab 50 will be secured in desired adjusted vertical position thereof, together with the steering mechanism and any other control apparatus which may be desired therein.

It will be understood that the front wall of the cab 50 has ample window area therein for viewing of the roadway by the operator riding within the cab 50. In the illustration shown in the drawings, a typical heavy, elongated load object is shown, the same comprising an exemplary reinforced concrete beam 106 which best is shown in FIG. 1. This elongated member rests, adjacent its opposite ends respectively, on the transverse rest 22 of the load supporting means 20 of the tractor unit 10 and corresponding transverse rest 22 of the load supporting means 46 of the trailer unit 36. Any suitable lashing means such as chains or cables 108 or clamping yokes and heavy draw bolts may be employed to securely anchor or fasten the member or object to be hauled to the transverse rest members of the load supporting means so as not to tilt or slip relative thereto. Preferably, for all practical purposes, the transverse pillows or rest means 22 may comprise heavy wooden beams of suitable length, not exceeding 8 feet so as to comply with highway regulations, said wooden beams also making it readily possible to secure thereto nailing pieces 110, or chocks, for example, if desired as when hauling pipe, which nailing pieces or chocks are placed in engagement with opposite sides of the objects being hauled to secure them against lateral movement. The nailing pieces readily may be secured by heavy spikes or bolts, for example.

From the arrangement as particularly illustrated in FIG. 1, it will be seen that the elongated object being hauled comprises the only connecting means capable of sustaining tension or draft forces that extend between the tractor and trailer unit. Due to the firm connection of opposite end portions of the elongated objects respectively to the load supporting members 20 and 46, ample draft force may be furnished to the trailer unit 34 for purposes of pulling the same along a highway. Due to the swivel connections of the load supporting members 20 and 46 relative to the respective frames of the tractor unit 10 and trailer unit 34, when the brakes are applied to the trailer unit 34, by means of the air hoses 112, for example, which may extend between the tractor and trailer units and which are supported where necessary by light slings 114 extending around the load object 106 at desired intervals, there will be no tendency to bend or deflect the elongated load object 106 in any way.

Figure 13:
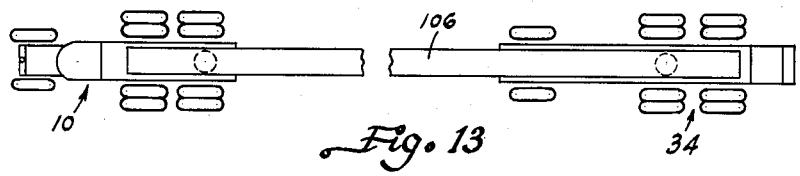
FIGS. 13, 14 and 15 are exemplary diagrammatic illustrations showing relative steering movements of the tractor and trailer units for purposes of negotiating a turn while hauling a load member of substantial length.
Figure 14:
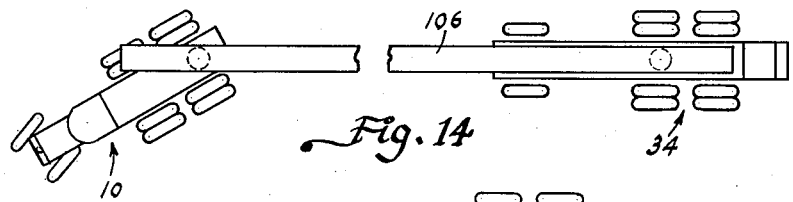
Figure 15:
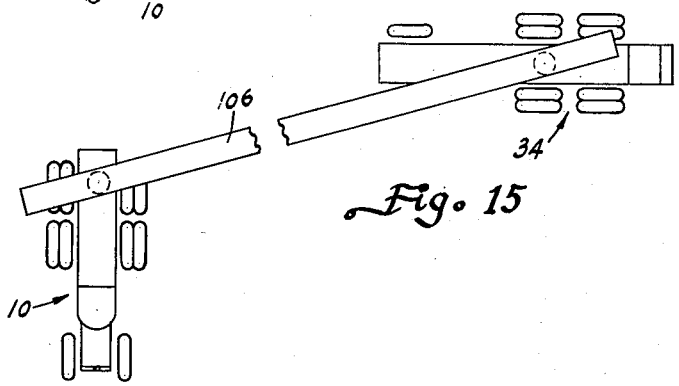

As is particularly evident from FIGS. 13, 14 and 15, by providing for independent steering of the heavy duty type trailer unit 34 by the steersman located in cab 50 comprising the steering and operator positioning means 48, much more effective and handy manipulation of the load is possible while traveling along highways, at job sites, at factory locations where the load objects are manufactured and/or stored, as well as under all other anticipated conditions under which the load object is to be handled from the time it leaves the factory until the time it is installed on the job site. Even when moving over uneven and rough terrain as is found in bridge constructions and the like, the installation of pipe line trenches, and various other kinds of engineering preparations where elongated members may be used which are of the type capable of being hauled by the vehicle means comprising the present invention, the tractor-trailer unit combination comprising said invention has performed with complete satisfaction under many adverse weather and terrain conditions, particularly with regard to delivering the hauled objects as close as possible to the job site where they are to be installed and particularly to locations where they can be engaged by crane equipment conventionally used in construction practice for finally positioning various kinds of heavy and elongated objects in the final location thereof.

After the vehicle means comprising the tractor unit 10 and trailer unit 34 have delivered a load of one or more elongated and/or heavy objects, and it is desired to deadhead back to the garage, for example, and particularly since the trailer unit 34 has no motive power of its own, it is necessary to provide suitable draft means for returning the trailer unit with the tractor unit. Accordingly, the present invention contemplates the use of an efficient yet simple hitch or coupling means which preferably can have the interengageable members thereof connected detachably together without requiring additional assistance from a hoist or the like and, when so connected, the forward end of the trailer unit is sufficiently elevated that the forward or steering wheels 44 thereof are elevated substantially above the roadway, as shown in exemplary manner in FIG. 2.

Referring to FIGS. 16 through 18, the first two of which are somewhat respectively plan and side exploded elevations, exemplary hitch or coupling means is illustrated. In these figures, it will be seen that the forward end of the frame 36 of the trailer unit 34 is provided with tongue means 118 which, for example, may comprise a pair of angle irons of suitable strength and size, the same being spaced apart to receive therebetween a heavy vertical pivot pin 120 which is suitably connected to the tongue members 118 such as by welding. The lower portion of the pin 120 is rounded and immediately above said rounded portion is a neck 122 of reduced diameter for purposes of receiving a U-shaped locking clevis 124 which is shown in plan view in FIG. 18 and in vertical sectional view in FIG. 17. A removable locking bolt 126 extends through aligned holes in the opposite legs of the clevis 124 as seen in FIG. 18.

The rear end of the chassis of the tractor unit 10 is provided with a ramp plate 128 extending rearwardly and downwardly to form a cam surface engageable by the rounded lower end of the pivot pin 120 when, for example, the tractor unit is backed against the forward end of the trailer unit while the latter is chocked, or otherwise stabilized against rearward movement. In the preferred construction of the trailer, it is provided with emergency brakes which can be controlled by the operator and such emergency brakes can be utilized to hold the trailer unit stationary while being coupled to the tractor unit by the foregoing procedure.

The ramp plate 128 may be made of heavy gauge steel plate material and reinforced by a pair of bracing fins 129. Centrally of the ramp plate 128 in a transverse direction is a pivot hole or bearing 130 of slightly larger diameter than that of the anchor pin 120. To facilitate the guiding of the lower end of the anchor pin 120 into the hole 130, the ramp plate 128 is provided with a pair of diverging vertical flanges 132 which, for example, may be forged or otherwise formed from suitable angle irons or other heavy steel plate material and attached to the ramp plate 128 by welding or any other appropriate means.

To employ the coupling means described above, it is only necessary to somewhat closely center the rear end of the tractor unit 10 relative to the front end of the trailer unit 34 so as to bring the lower end of the pivot pin 120 against the lower end of the ramp plate 128, between the outer ends of the guide flanges 132. Then, by continuing to move the tractor unit rearwardly, the rounded lower end of pin 120 will be cammed upwardly along the ramp plate 128 and the guide flanges 132 will cammingly steer the pin into position so as readily to be received within the pivot hole or bearing 130 when the pin reaches the top of the ramp 128. The pin drops through the hole 130 and the locking clevis 124 then is inserted within the neck portion 122 on the lower end of pin 120 so as to safely retain the trailer in pivotally supported relationship relative to the tractor unit and the forward end of the trailer unit is elevated in such manner that the entire weight thereof is supported on the rear wheels of the trailer unit.

To disconnect the trailer unit from the tractor unit, it is only necessary to remove the locking clevis 124 from pivot pin 120 and then lift the forward end of the trailer unit, by suitable cranes or other means such as portable ramps placed so the front wheels of the trailer may be run up on them to elevate the same relative to the rear end of the tractor, all of which usually are available on job sites, at yards handling heavy material such as carried by these vehicle means, truck servicing garages, and the like. The tractor and trailer units may be driven apart as soon as pin 120 is free from the pivot hole 130.

While the invention has been described and illustrated in its several preferred embodiments, it should be understood that the invention is not to be limited to the precise details herein illustrated and described since the same may be carried out in other ways falling within the scope of the invention as claimed.

We claim:

1. Vehicle means for hauling relatively rigid elongated objects and comprising a powered tractor unit having steering means and load supporting means swivelly connected thereto to receive the forward end of one or more elongated objects; in combination with a trailer unit having at least two axles spaced longitudinally of said trailer unit and wheels rotatably supported thereon, manually operable, steering means and operator positioning means carried by said trailer and adjustably positionable simultaneously and vertically thereon to a level to permit ready viewing above the load by an operator on said positioning means to steer the wheels on at least one of said axles of said trailer, load supporting means swivelly connected to said trailer unit in a position intermediately of said axles in a direction longitudinally of said trailer unit to receive the rearward end of one or more elongated objects, and means to effect such adjustment to vary the vertical position of said steering mechanism and operator positioning means and thereby render the same suitable for use with loads of various heights; the tractor and trailer units being connected for pulling of the trailer only by the elongated load objects extending between the load supporting means respectively thereon.

2. The vehicle means set forth in claim 1 further characterized by said means to support said operator positioning means and steering mechanism and means to effect vertical adjustment thereof respectively comprising transversely spaced sets of pivotally connected levers arranged in lazy tong fashion within substantially parallel vertical planes, and contractible means connected between opposed pivots of said sets of pivoted levers and operable upon contraction to elevate said operator positioning means and steering mechanism.

3. The vehicle means set forth in claim 2 further characterized by said contractible means comprising metallic cable tackle supported by blocks and means operable to pull said cable to move said blocks closer and thereby project the upper ends of said sets of pivotally connected levers vertically upward, and means engageable with certain of said relatively movable levers and operable to lock the same against relative movement to secure the sets of levers in said vertically adjusted position.

4. Vehicle means for hauling relatively rigid elongated objects and comprising in combination, a powered tractor unit having steering means, a pair of rear axles spaced longitudinally and having wheels thereon, load supporting means swivelly connected to said unit at a position longitudinally intermediate of said rear axles to receive the forward end of one or more elongated objects, a trailer unit having two rear axles spaced longitudinally of said unit and wheels thereon and a forward axle and wheels thereon, steering means carried by said trailer and positioned vertically thereon at a level to permit the operator to view operations from above the load, and load supporting means swivelly connected to said trailer unit adjacent said rear axles, said tractor and trailer units being connected for pulling of the trailer only by the elongated load objects extending between the load supporting means respectively carried by said units.

5. The vehicle means set forth in claim 4 further characterized by said load supporting means on said trailer unit being positioned longitudinally of said unit between said two rear axles but closer to the forwardmost rear axle than the other to distribute the load with maximum efficiency.

6. The vehicle means set forth in claim 5 further characterized by said steering means of said trailer unit being interconnected to the front wheels thereof and the front axle of said trailer unit being spaced from said rear axles a substantially greater distance than the rear axles are spaced from each other.

7. Vehicle means for hauling relatively rigid elongated objects and comprising a powered tractor unit having steering means and load supporting means swivelly connected thereto, a trailer unit having forward and rearward axles and wheels rotatably supported thereon, means upon said trailer operable to steer the wheels on the forward axle, load supporting means swivelly connected to said trailer unit intermediately of said axles, the tractor and trailer units normally being connected for pulling of the trailer only by an elongated load extending between the load supporting means thereon, and hitch means comprising coengageable members carried respectively by the rear end of said tractor and forward end of said trailer and said members being positioned vertically relative to said ends so that when said members are connected the forward end of said trailer and forward wheels thereof are supported by said tractor in elevated position above the level of the roadway, whereby said tractor may propel said trailer and automatically steer the same.

8. The vehicle means set forth in claim 7 further characterized by one of said coengageable hitch members comprising cam means sloping in a direction to effect the elevation of the forward end of said trailer unit upon relative longitudinal movement of said tractor and trailer units toward each other.

9. A trailer vehicle for hauling objects of variable height and comprising a frame, a plurality of axles thereon spaced longitudinally along said frame, wheels rotatably carried by said axles, load supporting means swivelly carried by said frame to support the rearward end of elongated load objects and at least the major portion thereof being positioned longitudinally between said axles, the wheels of the forward axle being movable for steering, and vertically adjustable steering means carried by said frame adjacent the rearward end of said vehicle and adjustably interconnected to said forward wheels to steer the same from a position at which the operator has a view extending from above the load upon said load supporting means, whereby said load objects comprise coupling means to connect said trailer to a tractor unit to which the forward end of said load objects are connected and said trailer vehicle may be freely steered for pivotal movement relative to the axis of said swivel connection of said load supporting means to said frame.

References Cited in the file of this patent

UNITED STATES PATENTS

| | | |
|---|---|---|
| 1,595,512 | Glogger | Aug. 10, 1926 |
| 1,996,695 | Bigley | Apr. 2, 1935 |
| 2,186,593 | Ronk | Jan. 9, 1940 |
| 2,271,808 | Starkey | Feb. 3, 1942 |
| 2,520,776 | Page | Aug. 29, 1950 |
| 2,743,116 | Morrell | Apr. 24, 1956 |
| 2,772,892 | Hake et al. | Dec. 4, 1956 |
| 2,987,936 | Selle | June 13, 1961 |

FOREIGN PATENTS

| | | |
|---|---|---|
| 1,198,625 | France | June 15, 1959 |
| 660,550 | Germany | May 28, 1938 |
| 86,663 | Switzerland | Sept. 16, 1920 |